Aug. 9, 1949.    T. J. LEHANE ET AL    2,478,588
TEMPERATURE CONTROL FOR RAILWAY COACHES
Filed Oct. 19, 1945    3 Sheets-Sheet 1

INVENTORS.
Timothy J. Lehane
Everett H. Burgess
By:— Harvey M. Gillespie
Att'y

Fig. 3

INVENTORS
Timothy J. Lehane and
Everett H. Burgess
By Harvey M. Gillespie
Atty.

Patented Aug. 9, 1949

2,478,588

UNITED STATES PATENT OFFICE 2,478,588

TEMPERATURE CONTROL FOR RAILWAY COACHES

Timothy J. Lehane and Everett H. Burgess, Chicago, Ill., assignors, by mesne assignments, to Vapor Heating Corporation, a corporation of Delaware Application October 19, 1945, Serial No. 623,340

17 Claims. (Cl. 257—3)

This invention relates to certain new and useful improvements in apparatus for electrically controlling the temperature of railway cars, particularly railway cars which are provided with means for circulating air at a desired heated or cooled temperature through the car and also means for supplying heat directly to the air within the car.

For the sake of brevity, the means for heating the circulated air will be hereinafter referred to as the over-head heater, and the means for supplying heat directly to the atmosphere within the car will be referred to as the floor heaters.

One of the principal objects of the present invention is to provide a control system in which the controls for the over-head heater will dominate the functioning of the controls for the floor heaters, but which will permit intermittent operations of the floor heaters, under the control of their own thermostats, while the over-head heater controls remain unsatisfied. In other words, this object of the invention aims to provide a system in which the floor heaters, during the normal heating operations, can receive heating medium only when the over-head heaters are functioning, but which will permit intermittent or cycling operation of the valves for supplying heating medium to the floor heaters at any time during such heating period if the control thermostat for the over-head heater is calling for heat.

Another object of the invention is to provide a heating system of the above general character in which the floor heaters may be operated under the domination of the over-head heater controls, but independently of the over-head heater when it is unnecessary to heat the car to its normal temperature, for example, when the car is out of service. In such case, a heater circuit is closed to add heat to the over-head control thermostat and thereby adjust it to a lower setting.

Another object is to provide in a temperature control system of the above character an automatically controlled means which is effective to direct heating medium to the inlet valves of the floor heaters only when the outside and inside temperatures are below certain predetermined points.

A further and more specific object is to provide a combined heating and cooling system for a railway car in which the controls for the cooling means, when the latter is functioning, will dominate the effectiveness of the controls for the heating means.

A further object is to provide a control system comprising a cooling means including a split evaporator, the separate parts of which become effective at different temperatures so that if one portion of the cooling means is sufficient to maintain the temperature below a predetermined maximum, the other portion of the cooler mechanism will remain inactive.

Another object is to provide a combined heating and cooling system in which control of the car temperature is transferred from the heater controls to the cooling controls at a predetermined temperature of the car, but the control of the car temperature will be transferred from the cooling controls to the heating controls only at a lower car temperature and following the lapse of a time period after the cooling controls have relinquished their dominance over the heater controls.

One preferred embodiment of the invention is illustrated in the accompanying drawings wherein.

Over-head heater

The over-head heater may be described briefly as comprising a radiator 10 located at one end of the car in an over-head duct 11. Heating medium, for example, steam, is supplied to the heater 10 from a main supply pipe 12 through branches 13—13a. The condensate may be discharged from the heater through pipe 14. A supply valve 15 is interposed between the supply branches 13—13a and is normally closed by means of a spring 16. The said valve is opened by the energization of a solenoid 17 to admit steam to the heater when the temperature of the car is below a predetermined maximum. The energization of the solenoid 17 is controlled by a switch 8 and by a thermostat K, the latter of which is arranged preferably at the breathing level within the car.

When the over-head heater 10 is operating, air from a blower 19 is forced through the radiator and is delivered into the car at different locations through a plurality of discharge openings, for example, the openings 20, 21 and 22.

Floor heater

Figure 2:
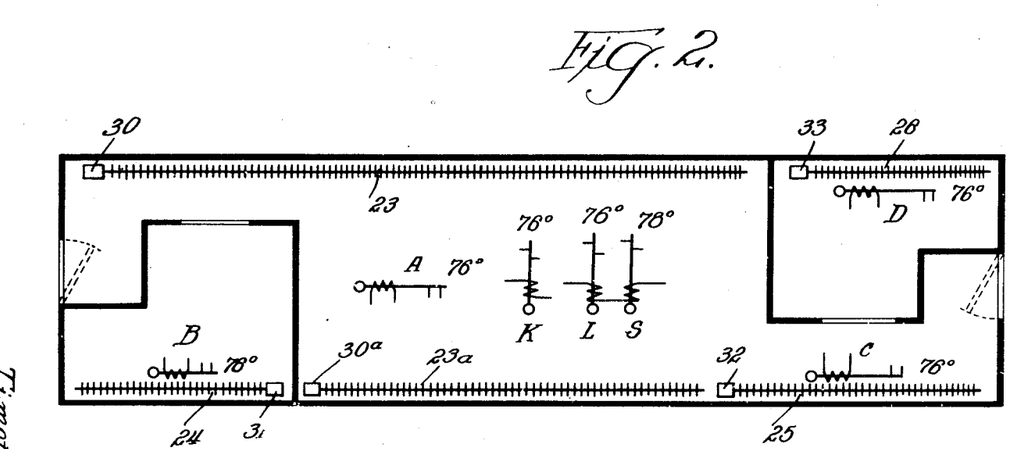
Fig. 2 is a diagrammatic plan view of the car illustrating a plurality of floor radiators arranged in different heating zones of the car, and showing also the thermostats for controlling the operation of the floor heaters, the overhead heater and the cooling means, and, Fig. 3 is a wiring diagram showing the electrical connections for the various control devices of both the over-head and floor heating heaters and for the cooling means.

The floor heaters consist preferably of radiators of the inner feed type arranged near the floor of the car. There may be any number of these radiators. For example, 5 as herein identified by the reference numerals 23—23a, 24, 25 and 26. The inner feed type of radiator consists of an outer pipe 27 provided with a plurality of heat dissipating fins 28 thereon and an inner feed pipe 29 which extends substantially the full length of the outer pipe. The heating medium is discharged from the inner pipe into the outer pipe at the end remote from the radiator inlet valve. The inlet valves for floor heaters 23—23a are designated by the reference numeral 30—30a and are controlled simultaneously, subject to the dominance of over-head thermostat K by a single thermostat, for example a thermostat designated A in Fig. 2 of the drawing. The floor heaters 24, 25 and 26 are arranged in different zones of the car and are controlled by separate thermostats so as to maintain uniform temperatures throughout the car. The inlet valves for said floor heaters are designated 31, 32 and 33 respectively and are separately controlled, subject to the dominance of thermostat K, by thermostats designated B, C and D.

Cooling means

Figure 1:
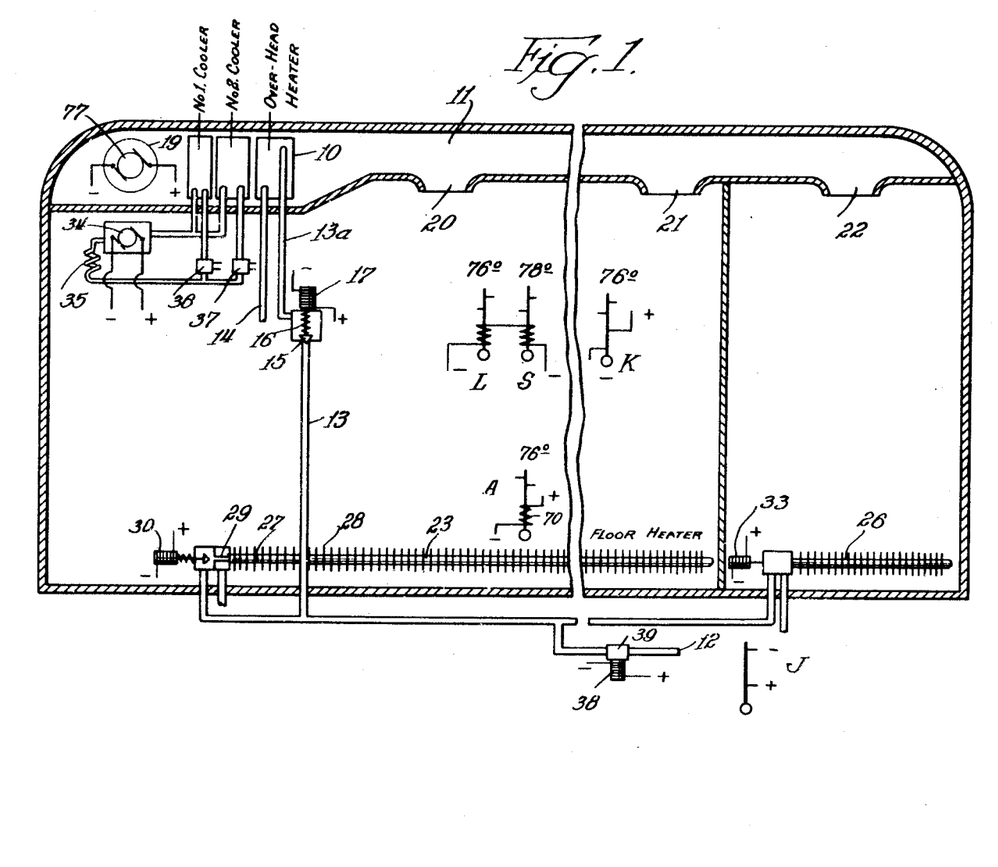
Fig. 1 is a diagrammatic sectional view taken through a railway car showing heating and cooling systems composed of an over-head heater, a pair of cooling coils and a plurality of floor heaters arranged in suitable locations in the car.

The cooling means is illustrated diagrammatically in Fig. 1 of the drawing as composed of two sections, to-wit, cooler No. 1 and cooler No. 2, a compressor 34, a condenser 35 and electrically controlled supply valves 36 and 37. The valve 36 controls the supply of cooling medium to cooler No. 1, and the valve 37 controls a supply of cooling medium to cooler No. 2. The blower 19 functions to force air through both cooler No. 1 and cooler No. 2 and through the over-head heater 10. Consequently, the blower 19 is intended to operate at all times during the functioning of either the over-head heater 10 or either section of the cooling means.

Main valve control

The cooling control means, because of their connection through a relay which is controlled by an outside thermostat J, becomes effective only when the outside temperature rises above a predetermined minimum, for example 50° F. At this outside temperature, the thermostat J functions to so condition the cooling means control circuits that when the temperature of the car rises to 76° F. to set the cooling means into operation, a circuit is closed through solenoid 38 of a main valve 39 to shut off the supply of heating medium to the inlet valves of all floor heaters and to the over-head heater. Consequently, the floor and the heaters are all made ineffective when the cooling means is functioning.

The over-head heater thermostat K is set preferably to function at a temperature of 76° F., which temperature may be composed of the room temperature plus varying amounts of auxiliary heat added to the thermostat by electric heater 40 until the room temperature reaches said 76° F. A thermostat L for controlling cooler No. 1 is set preferably to function at the same room temperature as the over-head thermostat, to-wit, 76° F. By reason of the auxiliary heater 40, the over-head thermostat K will cycle by recurrent opening and closing of its contacts until the room temperature reaches said 76° F. At this time, thermostat L will close and cooler No. 1 will be set in operation. It will continue in operation until the temperature of the car becomes sufficiently cool to warrant the discontinuance of the operation. When the said cooler No. 1 starts its operation, a circuit is closed through said auxiliary heater 40 which adds a substantial amount of heat to the over-head thermostat K so that the heat from heater coil 40 will not be dissipated for a substantial period of time after the cooling thermostat L has opened and thereby relinquished its control over the car temperature. For example, when thermostat L closes at a room temperature of 76° F., a relay M is energized to close a heating circuit through auxiliary heater 40ª of thermostat L so as to adjust the setting thereof to approximately 74° F. Consequently, when the thermostat L makes contact, the operating parts of the cooling means, for example the compressor 34, will remain in operation until the temperature of the car falls to 74° F. The closing of relay M also closes a similar heating circuit through auxiliary heater 40 of thermostat K to hold this thermostat in contact until the temperature of the car falls to 74° F. and for a suitable time period thereafter. Preferably, this time period is approximately one-half hour. It is controlled by the time necessary to cool the heater 40 after the thermostat L has opened its contacts. When this condition occurs, the overhead heater will be actuated to add sufficient heat to the circulated air to again raise the car temperature to 76° F. The thermostat S controls the operation of valve 37 for supplying cooling medium for cooler No. 2. Inasmuch as the functioning of the No. 2 cooler does not involve the starting and stopping of the compressor, the thermostat S can be operated to recurrently open and close the said valve 37 at frequent intervals. It should be here noted that the circuit for supplying heat to cooler thermostat L also adds an equal amount of heat to thermostat S for controlling cooler No. 2. Consequently, when the functional setting of thermostat L is lowered to 74° F., the functional setting of thermostat S is lowered from 78° F. to 76° F. It will be seen, therefore, that thermostat S will function at some temperature between 76° F. and 78° F.

Wiring diagram

Figure 3:
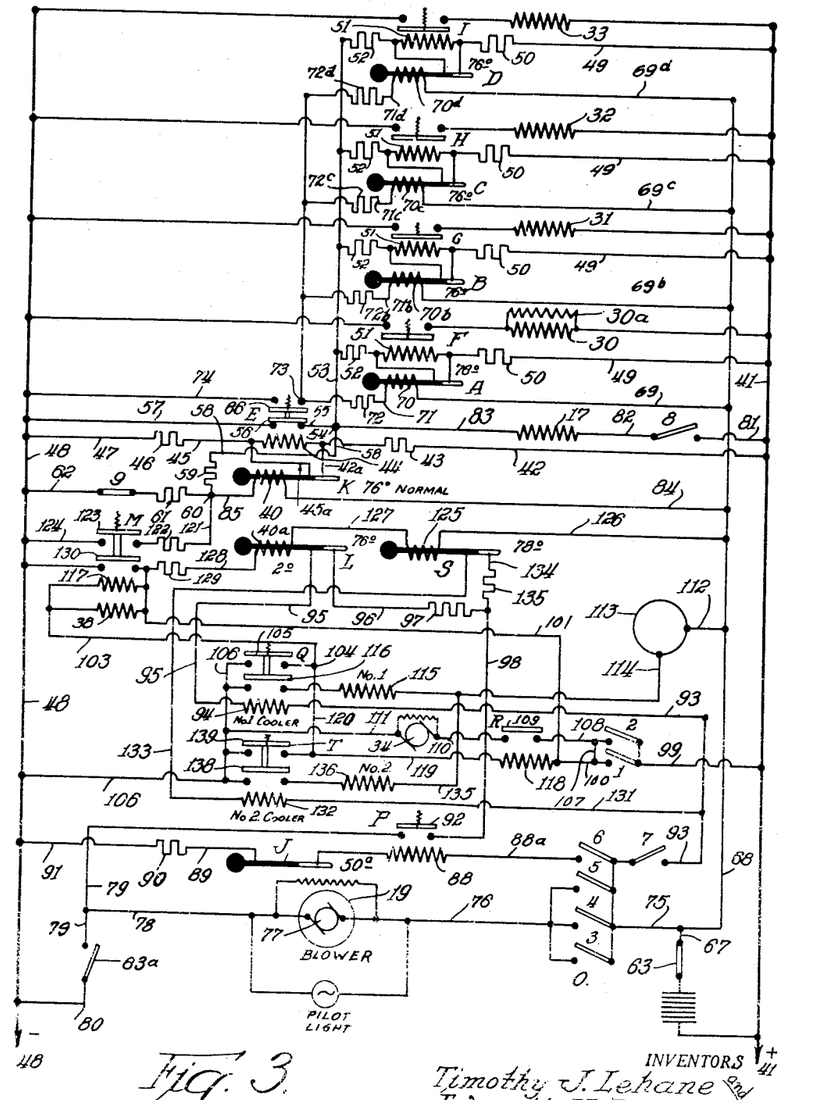

The electric circuits for controlling the several control means are shown diagrammatically in Fig. 3 of the drawings. The various operating devices are illustrated in the positions which they assume when the car is out of service, for example, during lay over periods when it is desirable to maintain the car at a temperature sufficient to prevent freezing of the water conduits, traps, etc.

Lay over circuits

During such lay over period, the switches 63 and 9 are closed to direct a heating circuit through auxiliary heater 40 to set this thermostat down to a suitable lay over temperature. This circuit leads from line 41, switch 63 and wires 67, 68 and 84 to auxiliary heater 40, thence through wire 85 to terminal 60, resistor 61, switch 9 and wire 62 to negative line 48. Another circuit leads from the positive line 41 through wire 42, resistor 43, solenoid 44 of overhead relay E, thence through wire 45, resistor 46, and wire 47 to the negative line 48. The position of relay E, as shown in Fig. 3, indicates that the thermostat is unsatisfied. In such case the solenoid 44 is energized to move the relay E to its down position and thereby close energizing circuits simultaneously through the solenoids for the several floor heater relays F, G, H and I. The energizing circuit for relay F leads from the positive line 41 through wire 49, resistor 50, solenoid 51 of relay F, thence through resistor 52, wire 53 to terminal 54, thence through wire 55, contact 56 of relay E and wire 57 to the negative line 48. The energization of relays F, G, H and I opens the valve energizing circuits through coils 30—30a, 31, 32 and 33 to permit the floor heater valves to open and admit heating medium into the floor heaters. It should be noted at this time that the value of resistor 59, which is interposed in a wire leading from terminal 54 to terminal 60, is such that no appreciable current will pass resistor 59 when switch 9 is closed. Consequently, the auxiliary heat applied to the over-head thermostat K to cause the mercury column to close the contacts 42a and 45a of thermostat K thereof is confined to current passing through resistor 61 when said switch 9 is closed. When the contact 66 of relay E is closed, auxiliary heat will be supplied to the floor thermostat A, but the heat thus supplied will not be effective since the adjusted lay over setting of thermostat K is substantially below the functional setting of the floor thermostat. However, it will be seen that said heating circuit leads from switch 63 through wire 67, 68 and 69, heater coil 70, wire 71, resistor 72 to relay fixed contact 73, thence through movable contact 66 of relay E and wire 74 to the negative line 48. Corresponding circuits are established through each of the other floor heater relays G, H, and I and are identified by the same reference numerals with the exponents b, c and d respectively. Inasmuch as the lower setting of the over-head thermostat K will control the functioning of the relays F, G, H and I and that the supply valve for each of the floor heaters is normally open to supply steam to the floor heaters, each of the said heaters will function during the lay over heating while thermostat K is closed. However, if for any reason one or more of the floor heater thermostats A, B, C or D should function while the thermostat K is calling for heat, the relay associated with said functioning thermostat will close so as to energize the inlet valve solenoid to close the floor heater.

*Normal service heating*

Assuming now that the outside temperature is below 50° F. and the car is in service so as to make it desirable to utilize both the over-head and the floor heaters. A master switch 0 is closed and both of the switches 63—63a are closed. The master switch 0 is composed of nine arms designated in Fig. 3 of the drawings as 1 to 9 inclusive. During lay over heating, the switch arms 1 to 8 inclusive are open and the arm 9 is closed. During the normal service operation, the switch arms 1 to 8 inclusive are closed, and the arm 9 is open. When the latter condition prevails, all of the initial lay over circuits are established, the same as previously described, except that the heating circuit for thermostat K through resistor 61 is opened at master switch arm 9. When the master switch arm 4 isclosed, the blower fan motor is energized through a circuit leading from switch 63, wire 67, wire 75, master switch arm 4, wire 76, blower fan motor 77, wire 78 and 79 to switch 63a and thence through wire 80 to the negative line 48.

The blower fan 77 operates to force air through the over-head heater 10 as previously described, and this heated air is delivered into the car through openings 20, 21 and 22. The supply valve 15 for the over-head heater is normally closed by means of the spring 16. It is opened by the energization of solenoid 17. This energizing circuit is closed when the master switch arm 8 is closed and when the solenoid 44 of relay E is energized to close the contact 56 of the relay. The energizing circuit then leads from positive line 41 through wire 81, switch arm 8, wire 82, valve solenoid 17, wire 83, to terminal 54, thence through wire 55, movable contact 56 of relay E and wire 57 to the negative line 48. Simultaneously with the closing of the circuit through the valve solenoid 17, to open the steam supply valve 15 for the over-head heater, a heating circuit is established through auxiliary heater 40 to add heat to the over-head thermostat K. This heater circuit leads from wire 68 through wire 84, auxiliary heater 40, wire 85, to terminal 60, thence through the cycle resistor 59 and wire 58, to terminal 54, and thence to the negative line 48 through wire 55, contact 56 of relay E and wire 57. When the temperature of the car plus the auxiliary heat added to the thermostat K is sufficient to cause the thermostat to function, the relay solenoid 44 is short-circuited, and the current is caused to pass from the positive to the negative side of the solenoid through wires 42a and 45a. This deenergization of the relay solenoid 44 releases the relay E so as to open the circuit through the over-head valve solenoid 17. The deenergized position of relay E closes its contacts 66 and thereby establishes the previously mentioned heater circuit through each of the floor heater thermostats A, B, C and D. The circuit through the heater for thermostat A comprises wire 69, auxiliary heater 70, wire 71, resistor 72, to relay contact 73, thence through movable contact 66 of relay E through wire 74 to the negative line 48. The heating circuits for the auxiliary heaters of thermostats B, C and D are in parallel with the circuit just described and are identified by the same reference characters with exponents b, c and d respectively. The energization of the auxiliary heaters for the floor heater thermostats bring about the functioning of said thermostats and thereby deenergize the relay solenoid so as to permit the relays F, G, H and I to close and thereby energize the floor radiator valve solenoids 30—30a, 31, 32 and 33 to close the inlet valve of the floor heaters. As soon as the auxiliary heater 40 of the over-head thermostat K cools sufficiently to open its contact 42a—45a, the relay E will be again actuated to close the circuit through over-head heater valve solenoid 17 and simultaneously break the heater circuit through the auxiliary heaters for floor heater thermostats A, B, C and D so as to permit these thermostats to break contact and thereby energize relays F, G, H and I to break the circuits through valve solenoids 30—30a, 31, 32 and 33. It will be seen, therefore, that the control devices for the over-head heater and for the floor heaters so cooperate that heating medium can be supplied to the floor heaters, during normal heating of the car, only when the over-head heater is receiving heating medium. However, it will be apparent that each of the floor heater thermostats may be effective to open or close the supply valve to its floor heater while the over-head heater is functioning. It will be seen also from the above disclosure that the cycling of the over-head thermostat K brings about a proportional cycling action of such of the floor heater thermostats which remain unsatisfied. This cycling action will continue with increasing frequency until the temperature of the car reaches 76° F. If the car reaches said temperature of 76° F. while the outside temperature remains below the functioning temperature of thermostat J, for example 50° F., both the over-head and floor heaters will remain operative under the domination of the over-head thermostat K.

*Floor heat shut off*

If the outside temperature rises to 50° F., the thermostat J closes an energizing circuit through solenoid 88 for energizing a relay P. This energizing circuit leads from master switch arm 6 through wire 88a, solenoid 88, outside thermostat J, wire 89, resistor 90 and wire 91 to negative line 48. The energization of relay P closes its contact 92 and thereby puts the control circuits in such condition that the control of the car temperature will be transferred from the over-head heater thermostat K to the cooler thermostat L when the temperature in the car rises to 76° F.

*Cooler No. 1 control*

Assuming now that the temperature outside of the car has risen above 50° F. and the inside temperature stands at 76° F., the contacts of thermostat L will be closed, thereby closing the circuit leading from master switch 7 through wire 93, solenoid 94 of cooler No. 1, relay Q, wire 95, cooler No. 1, thermostat L, wire 96, resistor 97, wire 98, closed contact 92 of relay P and wire 79 through switch 63a and wire 80 to the negative line 48. The energization of the said relay Q closes an energizing circuit No. 1 through solenoid 38 of the main valve 39 so as to shut off the supply of heating medium to all heaters. A parallel circuit No. 2 is closed through a solenoid to energize relay R. This closes a third circuit which leads through relay R for starting the compressor 34. A fourth circuit is closed through a solenoid to open the valve 36 for supplying cooling medium to cooler No. 1 and a fifth circuit is closed through said relay Q to energize relay M and thereby supply heating current to the auxiliary heaters 40 and 40ᵃ of thermostats K and L respectively. The first of the above circuits leads from master switch arm 1 through wires 100 and 101 through solenoid 38 and wire 103 to terminal 104, and thence through the closed contact 105 of relay Q and wire 106 to the negative line 48. The second of the above circuits leads from wire 100 through solenoid 118 and wires 119 to 120 to terminal 104 and thereafter follows the path through relay Q to the negative line 48. The third of the above circuits leads from master switch arm 1 through wires 107 and 108 through closed contact 109 of relay R, thence through wire 110, compressor 34 and wires 111 and 106 to negative line 48. The fourth circuit leads from wire 68 through wire 112, a delayer switch mechanism 113 (a known thermostat construction for holding the circuit closed for a fixed time period), wire 114 to solenoid 115 of cooler inlet valve 36, thence through the closed contact 116 of relay Q to wire 106, and negative line 48. The fifth circuit established by the energization of the relay Q includes a solenoid 117 which is in parallel with the circuit through the solenoid 38 so that upon the closing of the main valve 39, the relay M is energized to direct heating currents through the auxiliary heaters of thermostats K and L respectively.

From the above circuits it will be seen that upon the closing of the relay Q, the main valve 39 is closed so as to shut off the heating medium to all heaters, the compressor 34 is set in operation, the supply valve 36 for cooler No. 1 is opened so that the cooling means starts functioning to supply cooled air to the car.

*Lock out circuit for thermostat K*

Simultaneously with the starting of this cooling function, the relay M is closed and thereby establishes the heating circuit through auxiliary heater 40 of over-head heater thermostat K. This circuit leads from wire 68 through wire 84, auxiliary heater 40, wire 85 to terminal 60 thence through wire 121 to cycle resistor 122, closed contact 123 of relay M and wire 124 to negative line 48. The heating circuit through auxiliary heater of cooler thermostat L extends also through an auxiliary heater 125 for cooler thermostat S. This circuit leads from the positive branch 68 through wire 126, auxiliary heater 125, wire 127, auxiliary heater of thermostat L, wire 128, cycle resistor 129, through closed contact 130 of relay M to the negative line 48. The maximum auxiliary heat supplied to the heater of thermostat L is approximately 2° F. and therefore sufficient to hold the contacts of the thermostat closed until the temperature of the car falls to 74° F. This prevents frequent cycling of the thermostat and consequently prevents the stopping of the operating parts of the cooler means until temperature conditions within the car are such as to justify interruption of the cooling means. The heater circuit established through the auxiliary heater 40 of the over-head thermostat K by the closing of relay M increases the supply of current to the said heater 40 since the closing of said relay provides an additional outlet path of less resistance for the current. The normal outlet path for the current leads from the auxiliary heater 40 through wire 85, thence through cycle resistor 59 to terminal 54 and through relay E to the negative line 48. The additional current path leads from terminal 60 through wire 121, resistor 122 which is of less resistance than resistor 59, and closed contact 123 of relay M and wire 124 to the negative line 48. This additional heating current is sufficient to hold the overhead thermostat K closed until the temperature of the car falls to 74° F. and for a time period thereafter sufficient to permit the coil 40 to cool. This time period is preferably one-half hour, but it can be given any value desired. While the heater 40 is cooling, the heater of the thermostat L is also cooling to reestablish its functional setting at 76° F. It will be seen therefore that when the heater for thermostat L has cooled sufficiently the contact of heater thermostat K may be opened to start heating of the car at some point between 74° F. and 76° F. as the thermostat K approaches its normal setting. When this occurs, heating medium is again supplied to the over-head heater 10.

*Cooler no. 2 control*

Assuming that the operation of cooler No. 1 is insufficient to reduce the temperature to 74° F. and that the temperature continues to rise, the cooler No. 2 thermostat S will function somewhere between the temperature of 76° F. and 78° F. to close the circuit for actuating cooler No. 2 relay T. This lowering of the functional setting of thermostat S is the same as thermostat L since their heaters are in series. The actuating circuit for cooler No. 2 leads from wire 93 through wire 131, solenoid 132 of relay T, wire 133, closed contacts of thermostat S, wire 134, resistor 135, to wire 98 and thence through relay P to the negative line as previously described. The actuation of said relay T closes a circuit through cooler No. 2, valve 37, so as to make the said cooler No. 2 effective to cool the air supplied to the interior of the car. This circuit leads from wire 114 through wire 135, solenoid 136 and valve 37, thence through closed contact 138 of relay T and wire 106 to the negative line 48. When the relay T is actuated, it will be seen that the closed contact 139 of this relay and the closed contact 105 of relay Q functions to close the same circuits. Consequently, if for any reason the thermostat L should be inoperative, the functioning of the thermostat S will close all of the circuits except the one through the inlet valve 36 of cooler No. 1. These connections constitute an emergency measure to insure operation of the cooling means in the event that cooler thermostat L should fail to function. However, inasmuch as the normal operation of the relay T does not involve starting and stopping of the relatively heavy movable mechanism associated with the compressor 34, the thermostat S is permitted to cycle at any rate necessary to maintain the temperature of the car below 76° F.

From the above description, it will be apparent that the disclosure of this application is directed to arrangements and cooperative connections of the various devices for controlling the temperature of the car in such a manner that during the heating phase of the system, the controls for the floor heaters are dominated by the controls for the over-head heater and that during the cooling phase of the system, all heating controls are ineffective to operate at their normal settings until such time that the temperature of the interior of the car will warrant the discontinuance of the cooling function, which discontinuance will take place at a temperature below the normal functional setting of the heater thermostats, to-wit, somewhere between 74° and 76° F. It will also be observed from the disclosure of this application that the various instrumentalities shown are merely used for convenience of illustration, and therefore are not to be regarded as limitations on the scope of the invention.

We claim:

1. In apparatus for regulating the temperature of an enclosed space, a thermostat and a circuit making and breaking device associated therewith for opening and closing certain control electric circuits, a second control means including a second thermostat responsive to temperature changes within the space and an electric circuit making and breaking device associated with the second thermostat, a third circuit making and breaking device which is energized by one of the circuits closed through the second control means, means connected through said third circuit making and breaking device for adding heat to the first mentioned thermostat to change its functional setting, whereby the first mentioned control means is dominated by the functioning of the second mentioned control means, and a third control means including a thermostat responsive to outside temperature for making the second mentioned control means ineffective below a predetermined outside temperature.

2. In apparatus for regulating the temperature of an enclosed space, a thermostat and a circuit making and breaking device associated therewith for opening and closing certain control electric circuits, a second control means including a second thermostat responsive to temperature changes within the space and an electric circuit making and breaking device associated with the second thermostat, a third circuit making and breaking device which is energized by one of the circuits closed through the second control means, means connected through said third circuit making and breaking device for adding heat to the first mentioned thermostat to change its functional setting, means connected through said third relay for adding a substantially smaller amount of heat to the second mentioned thermostat to lower its functional setting, whereby the first mentioned control means is dominated by the functioning of the second mentioned control means and whereby the first mentioned thermostat will remain under the influence of its auxiliary heat for a period of time after dissipation of the smaller amount of auxiliary heat added to the second mentioned thermostat.

3. The combination of means for heating an enclosed space, means for cooling said space, and means for controlling the functioning of said heating and cooling means comprising a thermostat responsive to temperature changes within the enclosed space for controlling the functioning of said heating means, a thermostat responsive to temperature changes within said enclosed space for controlling the functioning of said cooling means, a thermostat outside said enclosed space set to function at a predetermined outside temperature, and electrical means conditioned by the functioning of the outside thermostat and the cooling means thermostat to make the heating means thermostat ineffective to control the temperature of said enclosed space when the temperature of the space rises to a predetermined point; the said electrical means including auxiliary electric heaters for the heating means thermostat and a relay energized by the functioning of the cooling means thermostat for applying heat to said auxiliary heater, whereby the functional setting of said heating means thermostat is lowered.

4. The combination of means for heating an enclosed space, means for cooling said space, and means for controlling the functioning of said heating and cooling means comprising a thermostat responsive to temperature changes within the enclosed space for controlling the functioning of said heating means, a thermostat responsive to temperature changes within said enclosed space for controlling the functioning of said cooling means, a thermostat outside said enclosed space set to function at a predetermined outside temperature, and electrical means conditioned by the functioning of the outside thermostat and said cooling means thermostat to make the heating means thermostat ineffective and the cooling means thermostat effective to control the temperature of said enclosed space; the said electrical means including auxiliary electric heaters for the heating means thermostat and the cooling means thermostat and a relay energized by the functioning of the cooling means thermostat for closing electric circuits through said heaters, whereby the functional settings of said heating means thermostat and said cooling means are lowered.

5. The combination of means for heating an enclosed space, means for cooling said space, and means for controlling the functioning of said heating and cooling means comprising a thermostat responsive to temperature changes within the enclosed space for controlling the functioning of said heating means, a thermostat responsive to temperature changes within said enclosed space for controlling the functioning of said cooling means, a thermostat outside said enclosed space set to function at a predetermined outside temperature, and electrical means conditioned by the functioning of the outside thermostat and said cooling means thermostat to make the heating means thermostat ineffective and the cooling means thermostat effective to control the temperature of said enclosed space; the said electrical means including an auxiliary electric heater for adding a large amount of heat to the heating means thermostat, auxiliary heaters for adding a relatively smaller amount of heat to the cooling means thermostat, and a relay for opening and closing energizing circuits through said heaters; the said relay being energized to close said heater circuits by the functioning of the cooling means thermostat whereby the functional settings of said heating means thermostat and said cooling means are lowered so as to continue the functioning of the cooling means below the normal setting of said heating means thermostat and whereby the heating means thermostat remains closed for a period of time after the cooling means thermostat has cooled sufficiently to open its contacts.

6. The combination of means for heating an enclosed space, means for cooling said space comprising a pair of cooling elements, and means for controlling the functioning of said heating means and cooling elements comprising a thermostat responsive to temperature changes within the enclosed space for controlling the functioning of said heating means, a pair of thermostats responsive to different temperatures within said enclosed space for separately controlling the functioning of said cooling elements, a thermostat outside said enclosed space set to function at a predetermined outside temperature, and electrical means conditioned by the functioning of the outside thermostat and one of said cooling means thermostats to make the heating means thermostat ineffective and the cooling thermostats effective to control the temperature of said enclosed space; the said electrical means including auxiliary electric heaters for the heating means thermostat and the cooling means thermostats and a relay energized by the functioning of the cooling means thermostats for closing electric circuits through said heaters, whereby the functional settings of said heating means thermostat and said cooling means thermostats are lowered.

7. The combination of means for heating an enclosed space including separate heating elements, each provided with an electrically actuated inlet valve for controlling the delivery of heating medium thereto, and means for controlling the temperatures of said enclosed space comprising a thermostat set to function at a predetermined temperature and a relay controlled thereby for opening a normally closed electric circuit through one of said inlet valves, a second thermostat set to function at the same temperature as the first mentioned thermostat and a relay controlled by said second thermostat for closing a normally open electric circuit through the other inlet valve and adapted, while the first mentioned thermostat calls for heat, to close an energizing circuit through the first mentioned relay to open the said normally closed electric circuit through one of said inlet valves.

8. The combination of means for heating an enclosed space including a heating element provided with a normally closed but electrically opened inlet valve for controlling the delivery of heating medium thereto, means including a thermostat set to function at a predetermined temperature and a relay controlled thereby for closing an electric circuit to open said inlet valve, a second heating element provided with a normally open but electrically closed inlet valve, means including a relay and an energizing circuit therefor connected through the first mentioned relay, whereby the inlet valve for the second heating element is made effective to deliver heating medium to its heating element when said thermostat calls for heat, and a second thermostat having the same functional setting as the first mentioned thermostat for deenergizing the second mentioned relay while the first mentioned thermostat remains unsatisfied.

9. The combination of means for heating an enclosed space including a heating element provided with a normally closed but electrically opened inlet valve for controlling the delivery of heating medium thereto, means including a thermostat set to function at a predetermined temperature and a relay controlled thereby for closing an electric circuit to open said inlet valve, a second heating element provided with a normally open but electrically closed inlet valve, means including a relay and an energizing circuit therefor connected through the first mentioned relay, whereby the inlet valve for the second heating element is made effective to deliver heating medium to its heating element when said thermostat calls for heat, and a second thermostat having the same functional setting as the first mentioned thermostat and effective only when the first mentioned thermostat is calling for heat, to control the operation of its associated relay to open and close the inlet valve of said second heating element.

10. The combination of means for heating an enclosed space including a heating element provided with a normally closed but electrically opened inlet valve for controlling the delivery of heating medium thereto, means including a thermostat set to function at a predetermined temperature and a relay controlled thereby for closing an electric circuit to open said inlet valve, a plurality of separate zone heating elements provided in each case with a normally open but electrically closed inlet valve, and means including a relay and an energizing circuit therefor connected through the first mentioned relay whereby the inlet valve for each of the zone heating elements is made effective to deliver heating medium to its zone heating element when said thermostat calls for heat and a plurality of zone thermostats, one for each of the zone heating element relays, and having the same functional setting as the first mentioned thermostat and separately effective, only when the first mentioned thermostat is calling for heat, to control the operation of its associated relay to open and close the inlet valve of one of said zone heating elements.

11. The combination of means for heating an enclosed space including a heating element provided with a normally closed but electrically opened inlet valve for controlling the delivery of heating medium thereto, means including a thermostat set to function at a predetermined temperature and a relay controlled thereby for closing an electric circuit to open said inlet valve, a plurality of separate zone heating elements provided in each case with a normally open but electrically closed inlet valve, means including a relay and an energizing circuit therefor connected through the first mentioned relay whereby the inlet valve for each of the zone heating elements is made effective to deliver heating medium to its zone heating element when said thermostat calls for heat, a plurality of zone thermostats, one for each of the zone heating element relays, and having the same functional setting as the first mentioned thermostat and separately effective, only when the first mentioned thermostat is calling for heat, to control the operation of its associated relay to open and close the inlet valve of one of said zone heating elements, and an auxiliary heater for each zone thermostat connected through the first mentioned relay for adding heat to the said zone thermostat when the first mentioned relay is deenergized.

12. The combination of means for heating an enclosed space including separate heating elements, each provided with an electrically actuated inlet valve for controlling the delivery of heating medium thereto, and means for controlling the temperature of said enclosed space comprising a thermostat set to function at a predetermined temperature and a relay controlled thereby for opening a normally closed electric circuit through one of said inlet valves, a second thermostat set to function at the same temperature as the first mentioned thermostat and a relay controlled by the second thermostat for closing a normally open electric circuit through the other inlet valve and adapted, while the first mentioned thermostat calls for heat, to close an energizing circuit through the first mentioned relay to open the said normally closed electric circuit through one of said inlet valves, an auxiliary heater for the second mentioned thermostat, and a manually operable switch device for closing a circuit through said heater and a circuit for energizing the first mentioned relay; whereby the second mentioned thermostat is caused to function to deenergize the second mentioned relay.

13. The combination of means for heating an enclosed space including separate heating elements, each provided with an electrically actuated inlet valve for controlling the delivery of heating medium thereto, and means for controlling the temperature of said enclosed space comprising a thermostat set to function at a predetermined temperature and a relay controlled thereby for opening a normally closed electric circuit through one of said inlet valves, a second thermostat set to function at the same temperature as the first mentioned thermostat for closing a normally open electric circuit through the other inlet valve and adapted, while the first mentioned thermostat calls for heat, to close an energizing circuit through the first mentioned relay to open the said normally closed electric circuit through one of said inlet valves, an auxiliary heater for the second mentioned thermostat, a manually operable switch device for closing a circuit through said heater and a circuit for energizing the first mentioned relay; whereby the second mentioned thermostat is caused to function to deenergize the second mentioned relay, and an auxiliary heater for the first mentioned thermostat having an energizing circuit connected through the deenergized second mentioned relay.

14. The combination of means for heating an enclosed space including a heating element for delivering heat into the space near the floor thereof and an over-head heating element each of which is provided with an electrically actuated inlet valve for controlling the delivery of heating medium thereto, and means for controlling the temperature of said enclosed space including a floor heater thermostat set to function at a predetermined temperature and a relay controlled thereby for opening a normally closed electric circuit through the inlet valve for said floor heater, an over-head heater thermostat set to function at the same temperature as the floor heater thermostat and a relay controlled by said over-head heater thermostat for closing a normally open electric circuit through the inlet valve for the over-head heater and adapted, while the over-head heater thermostat calls for heat, to close an energizing circuit through the floor heater relay to open the said normally closed electric circuit through the floor heater inlet valve, an auxiliary heater for the over-head heater thermostat, and a manually operable switch device for closing the circuit through the said heater and a circuit for energizing the floor heater relay; whereby the floor heater thermostat is caused to function to deenergize the floor heater relay.

15. The combination of means for heating an enclosed space including a heating element for delivering heat into the space near the floor thereof and an over-head heating element each of which is provided with an electrically actuated inlet valve for controlling the delivery of heating medium thereto, and means for controlling the temperature of said enclosed space including a floor heater thermostat set to function at a predetermined temperature and a relay controlled thereby for opening a normally closed electric circuit through the inlet valve for said floor heater, an over-head heater thermostat set to function at the same temperature as the floor heater thermostat and a relay controlled by said over-head heater thermostat for closing a normally open electric circuit through the inlet valve for the over-head heater and adapted, while the over-head heater thermostat calls for heat, to close an energizing circuit through the floor heater relay to open the said normally closed electric circuit through the floor heater inlet valve, an auxiliary heater for the over-head thermostat, and an auxiliary heater for the floor heater thermostat, having an energizing circuit connected through the deenergized over-head heater relay.

16. The combination of means for heating an enclosed space including an over-head heating element provided with a normally closed but electrically opened inlet valve for controlling the delivery of heating medium thereto, and means including a thermostat set to function at a predetermined temperature and a relay controlled thereby for closing an electric circuit to open said inlet valve, a plurality of floor heating elements arranged in different zones of the enclosed space and provided in each case with a normally open but electrically closed inlet valve, means including a relay and an energizing circuit therefor connected through the first mentioned relay, whereby the inlet valves for the several floor heating elements are made effective to deliver heating medium to the floor heaters when the over-head heater thermostat calls for heat, and a plurality of thermostats, one for each of the floor heater relays, having the same functional setting as the over-head heater thermostat adapted to function individually, when the over-head thermostat is calling for heat, to control the operation of its associated relay to open and close the inlet valve of a floor heater.

17. The combination of means for heating an enclosed space including an over-head heating element provided with a normally closed but electrically opened inlet valve for controlling the delivery of heating medium thereto, and means including a thermostat set to function at a predetermined temperature and a relay controlled thereby for closing an electric circuit to open said inlet valve, a plurality of floor heating elements arranged in different zones of the enclosed space and provided in each case with a normally open but electrically closed inlet valve, means including a relay and an energizing circuit therefor connected through the first mentioned relay, whereby the inlet valves for the several floor heating elements are made effective to deliver heating medium to the floor heaters when the overhead heater thermostat calls for heat, and a plurality of thermostats, one for each of the floor heater relays, having the same functional setting as the over-head heater thermostat adapted to function individually, when the over-head thermostat is calling for heat, to control the operation of its associated relay to open and close the inlet valve of a floor heater, and an auxiliary heater for each of the said floor heater thermostats connected in parallel with each other and through the over-head heater relay for adding heat to the floor heater thermostats when the over-head heater relay is deenergized.

TIMOTHY J. LEHANE.
EVERETT H. BURGESS.

REFERENCES CITED

The following references are of record in the file of this patent:

UNITED STATES PATENTS

| Number | Name | Date |
| --- | --- | --- |
| 2,138,505 | Parks | Nov. 29, 1938 |
| 2,328,472 | Lehane et al. | Aug. 31, 1943 |
| 2,346,592 | Lehane et al. | Apr. 11, 1944 |